(12) United States Patent
Vetterli

(10) Patent No.: US 7,350,455 B2
(45) Date of Patent: Apr. 1, 2008

(54) COFFEE MAKER

(75) Inventor: Heinz Vetterli, Wangen (CH)

(73) Assignee: Saeco IPR Limited (IE)

( * ) Notice: Subject to any disclaimer, the term of this patent is extended or adjusted under 35 U.S.C. 154(b) by 0 days.

(21) Appl. No.: 11/369,073

(22) Filed: Mar. 6, 2006

(65) Prior Publication Data

US 2006/0201339 A1    Sep. 14, 2006

(30) Foreign Application Priority Data

Mar. 8, 2005    (CH) .................................. 00396/05

(51) Int. Cl.
*A47J 31/30* (2006.01)

(52) U.S. Cl. .......................................... 99/280; 99/286

(58) Field of Classification Search .................. 99/279, 99/286, 275, 290, 289 R, 291–315, 280–283; 241/259.1, 250, 259.2, 247, 246
See application file for complete search history.

(56) References Cited

U.S. PATENT DOCUMENTS 5,193,438 A    3/1993    Courtois 5,458,295 A *    10/1995    Haber et al. ................. 241/100
6,095,032 A *    8/2000    Barnett et al. ................. 99/286
6,626,085 B1    9/2003    Lassota
6,827,002 B1 *    12/2004    Lin ............................. 99/286

FOREIGN PATENT DOCUMENTS

EP    0 472 272    2/1992
EP    0 766 943    4/1997
EP    1 44 0 642    7/2004

* cited by examiner

*Primary Examiner*—Timothy F. Simone

(57) ABSTRACT

A coffee maker is disclosed, having at least one coffee bean container adapted to receive whole coffee beans and a brewing module including a brewing chamber for brewing a coffee beverage by means of hot brewing water. The coffee bean container is subdivided into two compartments, whereby an individual coffee grinder assembly is assigned to each compartment. The outlets of the coffee grinder assemblies open into a common feeding channel serving for filling the brewing chamber with ground coffee. The coffee maker further comprises a slide controller serving for preselecting the proportional amount of coffee beans to be discharged from the particular compartment and ground by the coffee grinder assembly assigned to the particular compartment. With such a coffee maker, a coffee beverage can be prepared, using different blends of freshly ground coffee beans.

19 Claims, 1 Drawing Sheet

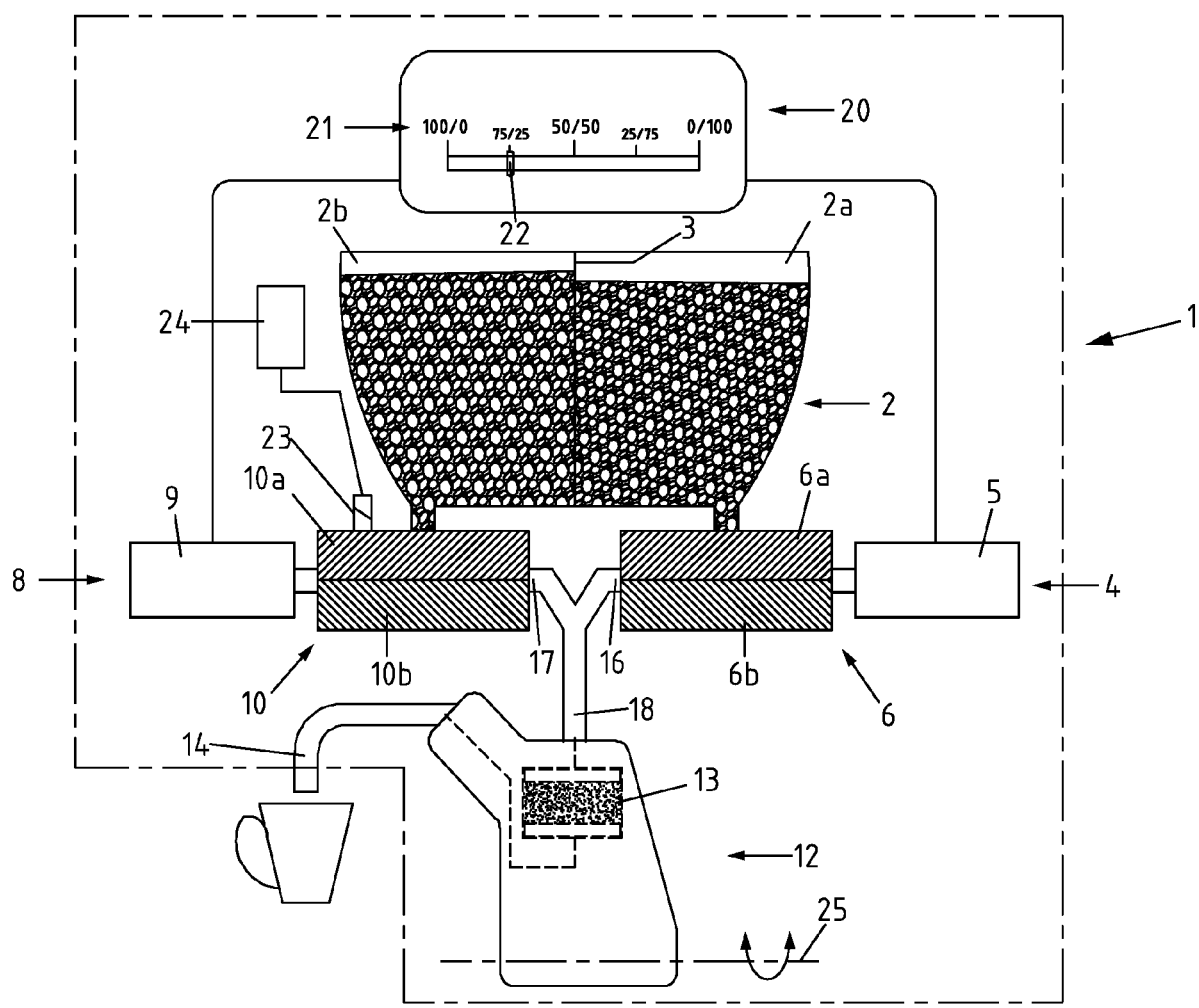

COFFEE MAKER

BACKGROUND OF THE INVENTION

The present invention refers to a coffee maker comprising at least one coffee bean container adapted to receive whole coffee beans to be ground, at least one coffee grinder assembly adapted to grind the whole coffee beans contained in the coffee bean container, and a brewing module having a brewing chamber adapted to receive the ground coffee from the coffee grinder assembly and to extract the ground coffee by means of hot brewing water.

Coffee makers of the kind referred to herein are predominantly used in household and serve for fully automatically preparing a fresh coffee beverage. In order to prepare a coffee beverage, a defined amount of coffee beans is discharged from the coffee bean container into the coffee grinder assembly and subsequently ground therein. The ground beans, i.e. the coffee powder, is fed to the brewing chamber where it is compressed. Hot, pressurized brewing water is fed into the brewing chamber to extract the coffee powder contained therein.

PRIOR ART

U.S. Pat. No. 5,193,438 discloses a coffee maker comprising two bean containers and two coffee grinder assemblies. The axes of rotation of the two coffee grinder assemblies extend in horizontal direction. The outlets of the two coffee grinder assemblies are connected to a vertical stub having a common outlet opening. The vertical stub is should be easily removable for the purpose of easy cleaning. A rotating support member is located below the outlet opening of the stub, provided with two receiving chambers for ground coffee located diametrically opposite to each other. The support member is rotatable in such a way that the respective receiving chamber can be brought from a fill position into a brewing position. In the brewing position, the coffee powder received in the respective chamber can be used for brewing a coffee beverage. The provision of two independent coffee bean containers and of two grinding assemblies should make it possible to prepare two different coffee beverages.

The document EP-A-0,472,272 discloses a fully automatic coffee machine comprising, besides the usual components, a milk froth unit as well as two coffee bean containers with two associated grinder assemblies. While one of the two coffee bean containers is adapted to receive conventional coffee beans, the other coffee bean container is adapted to receive decaffeinated coffee beans. Below the two grinding assemblies, a brewing unit is located, directly connected to one of the coffee bean containers by means of a feed channel. The other coffee bean container can be connected to the brewing unit by means of an electro-mechanically operated feed channel. By this design, it is allowed for gathering and grinding coffee beans selectively from the one or the other coffee bean container, with the result that the brewing unit is fed either with conventional or with decaffeinated coffee beans to freshly prepare an according coffee beverage.

The document EP-A-766,943 discloses a coffee maker having an electronic control unit and also comprising two coffee bean containers and two associated grinding assemblies. The electronic control unit is adapted to operate the respective grinder assembly. Thereby, the control unit shall, amongst else, consider the wearing down of the respective grinder assembly such that a constant quality of the prepared coffee beverage is assured. Contrary to the two previously discussed prior art coffee makers, this coffee maker comprises two separate brewing units in the form of manual filter holders that can be attached below the respective grinding unit.

OBJECTS OF THE INVENTION

It is an object of the present invention to provide a coffee maker in which the operator of the coffee maker has the possibility to prepare a coffee beverage in which not only one single kind of coffee beans is used for preparing the coffee beverage.

SUMMARY OF THE INVENTION

To meet this and other objects, the present invention provides, according to a first aspect, a coffee maker having a coffee bean container adapted to receive whole coffee beans to be ground and being subdivided into at least two compartments. At least two coffee grinder assemblies are provided, each assigned to one of said at least two compartments and adapted to grind said whole coffee beans contained in said assigned compartment. A brewing module has a brewing chamber adapted to receive the ground coffee from said at least two coffee grinder assemblies and to extract the ground coffee by means of hot brewing water. Further provided is at least one pre-selector means adapted to vary the amount of coffee beans to be gathered from each of said compartments and to be ground by the grinding assembly assigned thereto and used for brewing a coffee beverage.

According to a second aspect of the invention, the coffee maker has at least two coffee bean containers adapted to receive whole coffee beans to be ground and at least two coffee grinder assemblies, each assigned to one of said at least two coffee bean containers and adapted to grind said whole coffee beans contained in said assigned coffee bean container. A brewing module has a brewing chamber adapted to receive the ground coffee from said at least two coffee grinder assemblies and to extract the ground coffee by means of hot brewing water. Further provided is at least one pre-selector means adapted to vary the amount of coffee beans to be gathered from each of said coffee bean containers and to be ground by the grinding assembly assigned thereto and used for brewing a coffee beverage.

Due to the fact that the coffee maker is provided with preselecting means to pre-select the proportional amount of coffee beans discharged from each compartment and coffee bean container, respectively, ground by the coffee grinder assembly assigned to that particular compartment and coffee bean container, respectively, and finally used to brew the desired flavor of coffee beverage can be varied, the operator can use both kinds of coffee beans for preparing a coffee beverage. Alternatively, a coffee beverage can be selected that is prepared using coffee beans exclusively from one or the other one of the compartments and coffee bean containers, respectively.

BRIEF DESCRIPTION OF THE DRAWINGS

In the following, an embodiment of the coffee maker according to the invention will be further described, with reference to the accompanying sole drawing, which shows a strictly schematical illustration of the essential parts of the coffee maker according to the invention.

DETAILED DESCRIPTION OF A PREFERRED EMBODIMENT

The coffee maker 1 comprises a coffee bean container 2, which is subdivided into two compartments 2a, 2b by means of a partition wall 3. Below the compartment 2a, a first coffee grinder assembly 4 is located, and below the compartment 2b, a second coffee grinder assembly 8 is located. The first coffee grinder assembly 4 comprises two grinding wheels 6a, 6b, the lower grinding wheel 6a being driven by an electric motor 5 and the upper grinding wheel 6b being stationary fixed in the housing of the coffee grinder assembly 4. Correspondingly, the second coffee grinder assembly 8 comprises two grinding wheels 10a, 10b, the lower grinding wheel 10a being driven by an electric motor 9 and the upper grinding wheel 10b being stationary fixed in the housing of the coffee grinder assembly 8. Moreover, the coffee maker 1 comprises a brewing module 12 provided with a brewing chamber 13, serving for extracting the ground coffee beans by means of hot pressurized brewing water. The brewing module 12 is provided with an outlet 14 for the prepared coffee beverage.

Such a coffee bean container 2 having two separate compartments is particularly suited to receive two different blends or flavors of coffee beans. For example, the one compartment 2a may receive Arabica coffee beans and the other compartment 2b may receive Columbia coffee beans. Another possibility is to fill in normal coffee beans into one of the compartments, and to fill in decaffeinated coffee beans into the other compartment, such that, if required, anytime a partly or fully decaffeinated coffee beverage can be prepared without the need to replace coffee beans in the coffee bean container.

Each grinder assembly 4,8 is provided with an outlet 16, 17 to release the ground coffee powder. Both outlets 16, 17 open into a common feeding channel 18 through which the brewing chamber 13 is filled with coffee powder. The feeding channel 18 extends substantially in a vertical direction such that the ground coffee powder is fed through the feeding channel 18 into the brewing chamber 13 under the influence of gravity. Preferably, the brewing module 12 is pivotable about an axis 25 as shown in FIG. 1 between a feed position and a brewing position, in which the ground coffee powder is received in the brewing chamber 13 in a compressed state. The means for pivoting the brewing module 12 are not shown in the drawing.

The coffee maker 1 further comprises a preselector 20, e.g. in the form of a slide control member 22, e.g. a slide potentiometer, equipped with a scale 21. The preselector 20 serves for selecting the proportional amount of coffee beans to be fed from each of the two compartments 2a, 2b to the associated coffee grinder assembly 4, 8 to be ground therein and released to the brewing chamber 13. As shown in the drawing, in this embodiment, the slide control member 22 is in the position 75/25; this means that 75% of the total amount of coffee beans required for brewing the coffee beverage are taken from the left side of the compartment 2b, while the remaining 25% are taken from the right side compartment 2a. The slide control member 22 is connected to an electronic control unit 24 by means of which the two coffee grinder assemblies 4, 8 are individually and independently activated by employing sensors 23 for detecting the number of revolutions performed by the grinder assemblies 4, 8. The electronic sensors 23 are connected to the control unit 24 which is adapted to selectively vary the number of revolutions to be performed by the grinding assemblies, in accordance with the position of the slide control member 22.

In other words, in the present example the left side coffee bean grinder 8 is activated by the control unit 24 to grind 75% of the total amount of coffee beans required for a coffee beverage, and the side coffee bean grinder 4 is activated by the control unit 24 to grind 25% of the total amount of coffee beans required for the coffee beverage.

If a coffee powder mixture is to be used for preparing a coffee beverage, preferably, the two grinder assemblies are operated simultaneously at least during a certain time period to ensure that the two coffee flavors are mixed already in the feeding channel 18 and that a homogenous mixture of coffee powder is fed to the brewing chamber 13. The simultaneous operation of the two grinding assemblies 4, 8 has the further advantage that the grinding operation is shortened as far as the time is concerned. It is understood that the two grinding assemblies are activated one after the other one.

By moving the slider of the control member 22 to the left or to the right, the proportional amount of coffee beans to be gathered from the left side compartment 2b and the right side compartment 2a, respectively, can be adjusted. .

With the preselector of the present embodiment and as shown in the drawings, five different ratios can be preselected:

100% from the left compartment 2b and 0% from the right compartment 2a;

75% from the left compartment 2b and 25% from the right compartment 2a;

50% from the left compartment 2b and 50% from the right compartment 2a;

25% from the left compartment 2b and 75% from the right compartment 2a ; and

0% from the left compartment 2b and 100% from the right compartment 2a.

However, it is understood that this is only an example and any other graduation can be realized, even a continuous variation of the amounts of coffee beans to be gathered from the left side container 2b and the right side container 2a, respectively. Instead of a slide control member 22, a rotary control member, a rotary/push button control member or a plurality of push buttons, as the case may be even programmable, could be provided. Even a selection by means of a touch sensor or an approach sensor, for example a touch-screen display, would be possible.

A considerable advantage of a coffee maker 1 designed according the invention and along the lines described herein above may be seen in the fact that only one particular coffee bean flavor is ground in each of the two grinder assemblies 4, 8, due to the direct assignment of one of the grinder assemblies 4, 8 to one of the compartments 2a, 2b, respectively. Thus, always the same flavor of coffee beans is ground in each of the two grinder assemblies 4, 8, avoiding the drawback that residual amounts of coffee beans with another flavor could be present in the grinder assembly 4 and 8, respectively. On the other side, it is possible to use different coffee beans flavor for brewing a coffee beverage without the need to change the content of the coffee bean container, thereby rendering it possible to vary the taste of the resulting coffee beverage over a wide range by varying the proportional amounts gathered from the two compartments 2a, 2b.

Finally, it should be noted that the invention is not limited to the provision of two coffee bean compartments; it is understood that three or even more compartments could be provided, each having its own grinder assembly assigned to it. Moreover, it is also possible to provide two or more separate coffee bean containers instead of one subdivided container, each of these coffee bean containers discharging the its coffee beans to a separate coffee grinder assembly assigned to that particular coffee bean container.

What is claimed is:

1. Coffee maker, comprising:
   at least two compartments adapted to receive whole coffee beans to be ground;
   a coffee grinder assembly assigned to each of said at least two compartments and adapted to grind said whole coffee beans contained therein;
   a brewing module having a brewing chamber adapted to receive the ground coffee from each of said at least two coffee grinder assemblies and to extract the ground coffee by means of hot brewing water; and
   at least one pre-selector means for proportionately varying the amount of coffee beans gathered from each of said compartments and ground by said coffee grinder assembly assigned to each of said at least two compartments and provided to said brewing module for brewing a coffee beverage proportionately derived from the whole coffee beans from each of said at least two compartments.

2. Coffee maker according to claim 1, wherein said at least two compartments comprise at least two coffee bean containers adapted to receive whole coffee beans to be ground.

3. Coffee maker according to claim 1 in which said pre-selector means includes a rotary control means, a slider control means, a touch sensor means, an approach sensor means or a plurality of push buttons.

4. Coffee maker according to claim 1 in which said pre-selector means is operatively connected to an electronic control means adapted to operate the assigned grinding assembly.

5. Coffee maker according to claim 1 in which said pre-selector means is configured such that the proportional amount of coffee beans gathered from the respective compartments and ground by the coffee grinding assembly assigned to each of said at least two compartments for preparing the desired coffee beverage is variable between 0% and 100% such that the sum of the proportional amounts of gathered beans is equal to approximately 100%.

6. Coffee maker according to claim 4 in which said electronic control means is adapted to operate each of said coffee grinding assemblies simultaneously.

7. Coffee maker according to claim 1 in which each coffee grinder assembly includes an outlet for discharging the ground coffee, each of said outlets opening into a common feeding channel adapted to feed the ground coffee discharged from each coffee grinder assembly into said brewing chamber of said brewing module.

8. Coffee maker according to claim 1 in which said brewing module is movable or pivotable between a fill position and a brewing position, whereby it communicates with said feeding channel.

9. Coffee maker according to claim 1 in which each of said coffee grinder assemblies includes at least one grinding wheel, rotating during the grinding operation, and a sensor for detecting the number of revolutions performed by said at least one rotating grinding wheel, and in which said at least one pre-selector means includes an electronic control unit to which said sensors are connected and which is adapted to selectively vary the number of revolutions to be performed by the grinding wheels of each of said coffee grinder assemblies in accordance with the proportional amount of coffee beans to be discharged from a particular compartment or coffee bean container and used for brewing the coffee beverage preselected by said pre-selector means.

10. Coffee maker according to claim 2 in which said pre-selector means includes a rotary control means, a slider control means, a touch sensor means, an approach sensor means or a plurality of push buttons.

11. Coffee maker according to claim 2 in which said pre-selector means is operatively connected to an electronic control means adapted to operate the assigned grinding assembly.

12. Coffee maker according to claim 2 in which said pre-selector means is configured such that the proportional amount of coffee beans gathered from the respective compartments and ground by the coffee grinding assembly assigned to each of said at least two compartments for preparing the desired coffee beverage is variable between 0% and 100% such that the sum of the proportional amounts of gathered beans is equal to approximately 100%.

13. Coffee maker according to claim 2 in which each coffee grinder assembly includes an outlet for discharging the ground coffee, each of said outlets opening into a common feeding channel adapted to feed the ground coffee discharged from each coffee grinder assembly into said brewing chamber of said brewing module.

14. Coffee maker according to claim 2 in which said brewing module is movable or pivotable between a fill position and a brewing position, whereby it communicates with said feeding channel.

15. Coffee maker according to claim 2 in which each of said coffee grinder assemblies includes at least one grinding wheel, rotating during the grinding operation, and a sensor for detecting the number of revolutions performed by said at least one rotating grinding wheel, and in which said at least one pre-selector means includes an electronic control unit to which said sensors are connected and which is adapted to selectively vary the number of revolutions to be performed by the grinding wheels of each of said coffee grinder assemblies in accordance with the proportional amount of coffee beans to be discharged from a particular compartment or coffee bean container and used for brewing the coffee beverage preselected by said pre-selector means.

16. Coffee maker according to claim 4 in which each of said coffee grinder assemblies includes at least one grinding wheel, rotating during the grinding operation, and a sensor for detecting the number of revolutions performed by said at least one rotating grinding wheel, and in which said at least one pre-selector means includes an electronic control unit to which said sensors are connected and which is adapted to selectively vary the number of revolutions to be performed by the grinding wheels of each of said coffee grinder assemblies in accordance with the proportional amount of coffee beans to be discharged from a particular compartment or coffee bean container and used for brewing the coffee beverage preselected by said pre-selector means.

17. Coffee maker according to claim 1, wherein said at least one pre-selector means is operable to simultaneously activate said coffee grinder assembly assigned to each of said at least two compartments.

18. A coffee maker, comprising:
   at least two compartments adapted to receive whole coffee beans to be ground;
   at least two coffee grinders corresponding to each of said at least two compartments, said grinders operable to grind whole coffee beans received from a corresponding one of said compartments, each of said coffee grinders including at least one grinding wheel and a sensor for detecting the number of revolutions performed thereby;

a brewing module having a brewing chamber arranged to receive ground coffee from each of said at least two coffee grinders and operable to extract the ground coffee by means of hot brewing water;

a user-operated selector for selecting a proportion of coffee beans to be ground by each of said at least two coffee grinders for brewing a coffee beverage proportionately derived therefrom; and an electronic control unit receiving a signal from said sensor of each of said at least two coffee grinders indicative of the number of revolutions performed thereby and operable to control the number of revolutions of said at least one grinding wheel of each of said at least two coffee grinders in response to said user-operated selector.

19. Coffee maker according to claim 18, wherein said electronic control unit is operable to control said at least one grinding wheel of each of said at least two coffee grinders to rotate simultaneously.

* * * * *